United States Patent [19]

Kapulka et al.

[11] Patent Number: 4,878,167
[45] Date of Patent: Oct. 31, 1989

[54] METHOD FOR MANAGING REUSE OF HARD LOG SPACE BY MAPPING LOG DATA DURING STATE CHANGES AND DISCARDING THE LOG DATA

[75] Inventors: Kenneth M. Kapulka, San Jose; Holly A. Rader, Morgan Hill; Jimmy P. Strickland, Saratoga, all of Calif.

[73] Assignee: International Business Machines Corporation, Armonk, N.Y.

[21] Appl. No.: 880,387

[22] Filed: Jun. 30, 1986

[51] Int. Cl.⁴ .................. G06F 15/00; G06F 11/30
[52] U.S. Cl. ........................... 364/200; 364/300; 364/222.81; 364/267; 364/282.1
[58] Field of Search ... 364/200 MS File, 900 MS File, 364/300; 371/12, 13

[56] References Cited

U.S. PATENT DOCUMENTS 4,498,145  2/1985  Baker et al. .................... 364/900
4,507,751  3/1985  Gawhick et al. ............... 364/900
4,648,031  3/1987  Jenner .......................... 364/200

OTHER PUBLICATIONS

Crus et al., "Incremental Data Base Image Copy", IBM TDB, vol. 25, No. 7B, Dec. 1982, pp. 3730-3732.
Jenner, "Log Scopes of Interest", IBM TDB, vol. 25, No. 7A, Dec. 1982, pp. 3270-3273.
Kim et al., "Data Consistency and Exchange Among Nested Transactions in a Database", IBM TDB, vol. 27, No. 1B, June 1984, pp. 879-881.

Primary Examiner—Archie E. Williams, Jr.
Assistant Examiner—Thomas L. Lee
Attorney, Agent, or Firm—R. Bruce Brodie; Pryor A. Garnett

[57] ABSTRACT

A method for writing tagged (partitioned and classified) records from a first log stream to multiple recovery streams and discarding same from said first stream at the termination of the unit of recovery in a transaction-oriented system to permit first log stream reuse.

5 Claims, 11 Drawing Sheets

DISTRIBUTION OF TRANSACTION REDO/UNDO RECORDS & CHECKPOINTS & FAILURE

FIG. 1

COMMITTED UR
FIG. 2

ABORTED UR
FIG. 3

FORWARD RESOURCE RECOVERY
FIG. 4

LOGGING FLOW ACCORDING TO THE INVENTION

FIG. 5

TRANSACTION RECOVERY STREAM RECORD FORMAT

FIG. 6

| RESOURCE RECOVERY STREAM | RESOURCE NAME |
|---|---|
| RRS 1 | RESOURCE A |
| RRS 2 | RESOURCE B |
|  | RESOURCE C |
| NULL | RESOURCE D |

RRS MAPPING TABLE

FIG. 7

```
46
  BEGIN-UR
    INPUT:IN-DATA
    OUTPUT:OUT-URID

DO;
    OUT-URID= ASSIGN A NEW URID FOR THE UR PARTITION
    CREATE A LOG RECORD AS FOLLOWS:
        URID = OUT-URID
        TYPE = BEGIN
        DATA = IN-DATA;
    PUT THE RECORD INTO THE TRANSACTION RECOVERY STREAM;
    ENDDO;
```

BEGIN UR PROCEDURE

*FIG. 8*

```
48
  COMMIT-UR
    INPUT:IN-URID
          IN-DATA
    OUTPUT:OUT-RETURN-CODE

IF IN-URID IS VALID THEN
      DO;
        CREATE A LOG RECORD AS FOLLOWS;
            URID = IN-URID
            TYPE = COMMIT
            DATA = IN-DATA;
        PUT THE RECORD INTO THE TRANSACTION RECOVERY STREAM;
        FOR EACH LOG RECORD SUCH THAT
        (URID = IN-URID &
         TYPE = REDO)
         DO;
           IDENTIFY THE DESTINATION RESOURCE RECOVERY STREAM
               USING THE RRS MAPPING TABLE
           IF THE RESOURCE RECOVERY STREAM IS NOT NULL THEN
               COPY DATA TO THE RESOURCE RECOVERY STREAM;
           ENDIF;
         ENDDO;
        ENDFOR;
        OUT-RETURN-CODE =OK;
      ENDDO;
    ELSE
      OUT-RETURN-CODE =INVALID URID;
    ENDIF;
```

COMMIT UR PROCEDURE

*FIG. 9*

```
50
ABORT-UR
  INPUT: IN-URID
         IN-DATA
  OUTPUT: OUT-RETURN-CODE

IF IN-URID IS VALID THEN
    DO;
      CREATE A LOG RECORD AS FOLLOWS
        URID = IN-URID
        TYPE = ABORT
        DATA = IN-DATA;
      PUT THE RECORD INTO THE TRANSACTION RECOVERY STREAM;
      FOR EACH LOG RECORD SUCH THAT
      (URID = IN-URID &
       TYPE = UNDO)
        DO;
          IDENTIFY THE DESTINATION RESOURCE RECOVERY STREAM USING THE
            RRS MAPPING TABLE;
          IF THE RESOURCE RECOVERY STREAM IS NOT NULL THEN
            COPY DATA TO THE RESOURCE RECOVERY STREAM IN REVERSE SEQUENCE;
          ENDIF;
        ENDDO;
      ENDFOR;
      OUT-RETURN-CODE = OK;
    ENDDO;
  ELSE
    OUT-RETURN-CODE = INVALID URID;
  ENDIF;
```

ABORT UR PROCEDURE
*Fig. 10*

```
52
END-UR
  INPUT: IN-URID
         IN-DATA
  OUTPUT: OUT-RETURN-CODE

IF IN-URID IS VALID THEN
    DO;
      CREATE A LOG RECORD AS FOLLOWS:
        URID = IN-URID
        TYPE = END
        DATA = IN-DATA;
      PUT THE RECORD INTO THE TRANSACTION RECOVERY STREAM;
      WAIT UNTIL THE COPY FUNCTIONS TO THE RESOURCE
        RECOVERY STREAMS COMPLETE FOR THE SPECIFIED UR PARTITION;
      FOR EACH LOG RECORD SUCH THAT
      (URID = IN-URID)
        DELETE THE LOG RECORD FROM THE TRANSACTION RECOVERY STREAM;
      ENDFOR;
      OUT-RETURN-CODE = OK;
    ENDDO;
  ELSE
    OUT-RETURN-CODE = INVALID URID;
  ENDIF;
```

END UR PROCEDURE
*Fig. 11*

54 —↘
```
WRITE-UR
    INPUT: IN-URID
        IN-TYPE (UNDO OR REDO)
        IN-RESOURCE-NAME (RRS MAPPING TABLE)
        IN-DATA
    OUTPUT: OUT-RETURN-CODE

IF IN-URID IS VALID THEN
        IF IN-RESOURCE-NAME IS IN THE RRS MAPPING TABLE
        DO;
            CREATE A LOG RECORD AS FOLLOWS:
                URID = IN-URID
                TYPE = IN-TYPE
                RESOURCE-NAME = IN-RESOURCE-NAME
                DATA = IN-DATA;
            PUT THE RECORD INTO THE TRANSACTION RECOVERY STREAM;
            OUT-RETURN-CODE = OK;
        ENDDO;
        ELSE
            OUT-RETURN-CODE = INVALID RESOURCE NAME;
        ENDIF;
    ELSE
        OUT-RETURN-CODE = INVALID URID;
    ENDIF;
```
WRITE UR PROCEDURE

*Fig. 12*

| #  | URID | TYPE  | RESOURCE   | DATA    |
|----|------|-------|------------|---------|
| 1  | UR 1 | BEGIN |            | RM DATA |
| 2  | UR 1 | UNDO  | RESOURCE A | RM DATA |
| 3  | UR 2 | BEGIN |            | RM DATA |
| 4  | UR 1 | REDO  | RESOURCE A | RM DATA |
| 5  | UR 1 | UEDO  | RESOURCE B | RM DATA |
| 6  | UR 2 | UNDO  | RESOURCE A | RM DATA |
| 7  | UR 2 | REDO  | RESOURCE A | RM DATA |
| 8  | UR 2 | UNDO  | RESOURCE C | RM DATA |
| 9  | UR 2 | REDO  | RESOURCE C | RM DATA |
| 10 | UR 2 | UNDO  | RESOURCE C | RM DATA |
| 11 | UR 2 | ABORT |            | RM DATA |

24A / TRS

ABORT OF UR2

*Fig. 13*

FIG. 14 — ABORT OF UR 2

FIG. 15 — COMMIT OF UR 1

FIG. 18

TRS
RECORD DELETION FOR UR1
FIG. 19

RECORD DELETION FOR UR 1
Fig. 20

TRS
END OF UR 2
Fig. 21

FIG. 22

RECORD DELETION FOR UR 2
FIG. 23

METHOD FOR MANAGING REUSE OF HARD LOG SPACE BY MAPPING LOG DATA DURING STATE CHANGES AND DISCARDING THE LOG DATA

TECHNICAL FIELD

This invention relates to a method for reducing the amount of and managing log data which must be accessed and processed in a transaction-oriented system in which concurrently executing, failureindependent processes share a common log.

BACKGROUND

As pointed out by C. J. Date, "An Introduction to Data Base Systems", Vol. 1, 4th Edition, Addison-Wesley Publishing Co., copyright 1986, Ch. 18, a "transaction" is a logical unit of work referencing a sequence of operations that transforms a consistent state of a recoverable resource into another consistent state without necessarily preserving consistency at all intermediate points. For purposes of this discussion, a data base will be referenced as a typical instance of a recoverable resource.

A system supporting transaction processing guarantees that if the transaction executes some updates against the data base and a failure occurs before the transaction reaches its normal termination, then those updates will be undone. Consequently, the transaction either executes in its entirety or it is totally cancelled. Since a transaction comprises execution of an application-specified sequence of operations, it is initiated with a special BEGIN transaction operation and ends with either a COMMIT operation or an ABORT operation. The COMMIT and ABORT operations are the key to providing atomicity.

The COMMIT operation signifies several attributes. First, it indicates that a transaction has successfully terminated. Second, it indicates that the data base is in a consistent state. Lastly, the COMMIT operation indicates that all of the updates made by that unit of work can now be committed or made permanent. In contrast, the ABORT operation signifies an unsuccessful end of transaction. That is, the ABORT means that a fault has occurred, that the data base may be in an inconsistent state, and that all of the updates made by the transaction must be "rolled back" or undone.

Transactions are executed on stored program-controlled systems whose logical and physical attributes are generically denominated "resources". Also, such systems may be considered to operate in modes such as a "processing" mode or, in the event of failure, one or more "recovery" modes. Control of both the access to and the operation of the resources is exercised by operating system (OS) software. These and denomiated "resource managers". Similarly, the transaction-oriented processing and recovery operations are governed by OS software denomiated "transaction processing" and "recovery managers".

As pointed out by Deitel, "An Introduction to Operating Systems", Revised 1st Edition, Addision-Wesley Publishing Co., copyright 1984, pp. 103–108, resource managers may be thought of as "monitors". A monitor is a concurrency construct that contains both the data and procedures needed to perform allocation of a particular shared resource or group of shared resources. That is, a monitor is a mechanism that allows the safe and effective sharing of abstract data types among several processes.

In a transaction-oriented data base system, all changes to the data base are written to a log in support of recovery in the event of interruption. Each transaction utilizes BEGIN, COMMIT, ABORT, or END primitives in order to bound the COMPLETION, UNDO, or REDO of each transaction.

It may be observed that a checkpoint record is a list of all transactions alive at the time of the checkpoint, together with the log address of each transaction's most recent log record. A transaction whose records are used in its REDO is a transaction that has terminated (committed) between the last checkpoint and the occurrence of failure, whereas a transaction whose records are used in its UNDO is one that has not terminated at the time of the occurrence of failure. Thus, REDOs require transaction return to the most recent COMMIT point, while UNDOs require return to the transaction BEGIN point.

It should be appreciated that transactions define not only the unit of work, but also a unit of recovery. It is necessary for the system to know at restart or recovery time which transactions to UNDO and which to REDO. The snapshot or checkpoint taken at predetermined times certainly lists all transactions that were in progress at the time the checkpoint was taken. Thus, depending on the point in time when a failure occurred, the system can construct an UNDO list and a REDO list by working backward through the log, undoing the transactions in the UNDO list, and then working forward again, redoing the transactions in the REDO list. Only when all such recovery activity is completed can the system be in a position to accept any new work. Strictly speaking, it is the checkpoint plus succeeding log activity which must be processed to affirm the UNDO and REDO lists.

In the prior art, several references describe fault-tolerant, transaction-oriented data base systems. These include:

(1) Gawlick et al, U.S. Pat. No. 4,507,751, "Method and Apparatus for Logging Journal Data Using a Log Write Ahead Data Set", issued Mar. 26, 1985.

(2) Baker et al, U.S. Pat. No. 4,498,145, "Method and Apparatus for Assuring Atomicity of Multirow Update Operations in a Database System", issued Feb. 5, 1985.

(3) Paradine et al, U.S. Pat. No. 4,159,517, "Journal Back-up Storage Control for a Data Processing System", issued June 26, 1979.

(4) Reinsch et al, "Method for Restarting a Long-running, Fault-tolerant Operation in a Transaction-oriented Data Base System Without Burdening the System Log", copending U.S. Ser. No. 06/835,396, filed Mar. 3, 1986.

(5) Jenner, "Method and Apparatus for Restarting a Computing System", copending U.S. application Ser. No. 06/390,163, filed June 21, 1982.

The current logging technology represented by the references writes all log data produced by a transaction-oriented system into a single stream of data physically resident at a point in time on multiple DASD or tape devices with only one device being written upon at each instant. The Gawlick, Baker, and Paradine patents and the copending Reinsch and Tenner applications respectively describe (1) the writing to a log before record updating, (2) buffer dumping to a log, (3) writing to a hard and soft log concurrently to assure multirow atomic updating, (4) the utilization of a restartable load utility in which all changes to the data base are typically written to a log in support of recovery in the event of interruption, and (5) updating state tables of the subsystem components as to their recovery dependencies in the event of restart to assist actual restart of a log-based transaction system caused by randomly occurring faults.

The art also distinguishes the types of information required in the failure recovery of a system from that involved in the failure recovery of a resource. System recovery involves bringing system resources to a prior state of consistency, while resource recovery involves the recreation of a consistent image of a resource after it has been corrupted.

The art uses certain terms as synonyms. For instance, the "control" and/or "information state" of a resource or a system may also be termed its "image". In transaction processing, this would most frequently reference the data sets memorializing transactions.

SUMMARY OF THE INVENTION

It is an object of this invention to devise a method for efficiently managing log-based recovery in transaction-oriented systems. It is a related object to devise a method for reducing the amount of log data which must be accessed and processed to effectuate said recovery.

The aforementioned objects are satisfied by a method for writing tagged (partitioned and classified) records from a first log stream to multiple recovery streams and discarding said tagged records from said first stream at the termination of the unit of recovery to permit first log stream reuse. More particularly, the inventive method for reducing the amount of log data accessed and processed in a transaction-oriented system in which concurrently executing, failureindependent processes share a common log comprises the steps of (a) recording log data in a partitioned fashion by unit of recovery in a transaction recovery stream (TRS); (b) classifying the log data as a function of its role in recovery (BEGIN, COMMIT, ABORT, END, REDO, UNDO); (c) responsive to unit of recovery state changes (COMMIT/ABORT), performing a one-to-n mapping of a subset of the log data (REDO/UNDO) from a UR partition on the TRS into resource recovery streams (RRSs); and (d) at the termination (END) of the unit of recovery state changes utilizing the RRSs, discarding all log data associated with the UR from the TRS.

The method of this invention generates two data structures to assist in recovery. These include the TRS and the RRS. The TRS, together with checkpoint and status change information, is used to recover the transaction management environment after a failure. The TRS contains the data to determine the unit of recovery (UR) state, the data necessary to ensure an ABORT of a UR, and the data necessary to ensure the COMMIT of a UR. All data logged on behalf of a UR is included as part of the TRS.

The RRS is used to forward recover resources. By this is meant the recreation of a valid image of a resource starting from a valid copy of the resource occurring at some predetermined point in time. Based upon UR COMMIT or ABORT, records required for forward resource recovery are copied from the TRS into a predetermined one or more RRSs.

The TRS is a highly dynamic log data structure permitting resolution of resource inconsistencies created by those URs which were active at the time of the occurrence of a failure. The TRS is the repository for logged data which was associated with active URs, active URs being those transactions executing between BEGIN and END boundaries.

It should be recalled that each transaction utilizes BEGIN, COMMIT, ABORT (REDO, UNDO) or END primitives to bound the transaction. REDOs ensure transaction return to the most recent COMMIT point, while UNDOs ensure return to the transaction BEGIN point.

As previously mentioned, the RRS contains data necessary for forward recovery from an image copy of a resource. The inventive method creates any number of RRSs. Thus, each application software using the transaction-oriented data base system can specify the resource name. Thus, each log write request can specify the resource to which a particular record should belong. This includes selecting the record-type semantics specifying the conditions under which a given record can be copied from the TRS to an RRS. Records required to ensure REDO of a transaction may only be copied to the RRS once the associated UR enters the ENSURE-COMMIT state. Records required to ensure the UNDO of a transaction may only be copied to the RRS once the associated UR enters the ENSURE-ABORT state.

From the foregoing, it is apparent that by utilizing the method of this invention and maintaining only consistent images of the data in the RRS, a reduction in the storage requirement for RRS information has been attained. This is because UR state records and uncommitted data records need not be included in the saved data. Also, the elimination of uninteresting records reduces I/O during resource recovery. Lastly, processing during recovery is reduced because the UR state need not be established before applying the data images to the copy.

BRIEF DESCRIPTION OF THE DRAWING

FIG. 1 depicts the occurrence of primitives bounding a transaction with respect to their completion with reference to both checkpointing and system failure.

FIGS. 2–3 show a unit of recovery and its bounding primitives where the recovery respectively involves the REDO and UNDO of transactions.

FIG. 4 schematically illustrates the forward resource recovery process.

FIG. 5 sets out a high-level control flow of the logging method.

FIG. 6 illustrates the format of the log records within the transaction recovery stream.

FIG. 7 shows a concordance between resource names and resource recovery streams.

FIG. 8 is a pseudo-code delineation of the BEGIN UR procedure.

FIG. 9 is a pseudo-code delineation of the COMMIT UR procedure.

FIG. 10 is a pseudo-code delineation of the ABORT UR procedure.

FIG. 11 is a psuedo-code delineation of the END UR procedure.

FIG. 12 shows the high-level pseudo-code delineating the writing of resource recovery records.

FIG. 13 shows a transaction recovery stream (TRS) for two transactions UR1 and UR2, with an entry aborting UR2.

FIG. 14 shows two resource recovery streams RRS 1 and RRS 2 in accordance with FIG. 7 after UR2 is aborted according to FIG. 13.

FIG. 15 shows the TRS of FIG. 13 after the subsequent COMMIT or UR1.

FIG. 16 shows RRS 1 and RRS 2 after the COMMIT of UR1 according to FIG. 15.

FIG. 17 shows the TRS after the END of UR1.

FIG. 18 shows RRS 1 and RRS 2 after the END of UR1 according to FIG. 17.

FIG. 19 shows the TRS after the deletion of records for UR1.

FIG. 20 shows RRS 1 and RRS 2 after the deletion of records for UR1 according to FIG. 19.

FIG. 21 shows the TRS after the END of UR2.

FIG. 22 shows RRS 1 and RRS 2 after the END of UR2 according to FIG. 21.

FIG. 23 shows the empty TRS after the deletion of records for UR2.

FIG. 24 shows RRS 1 and RRS 2 after the deletion of records for UR2 according to FIG. 23.

FIG. 25 is a schematic illustration of the system components of a computing system according to this invention.

DESCRIPTION OF THE PRIOR ART

Figure 1:
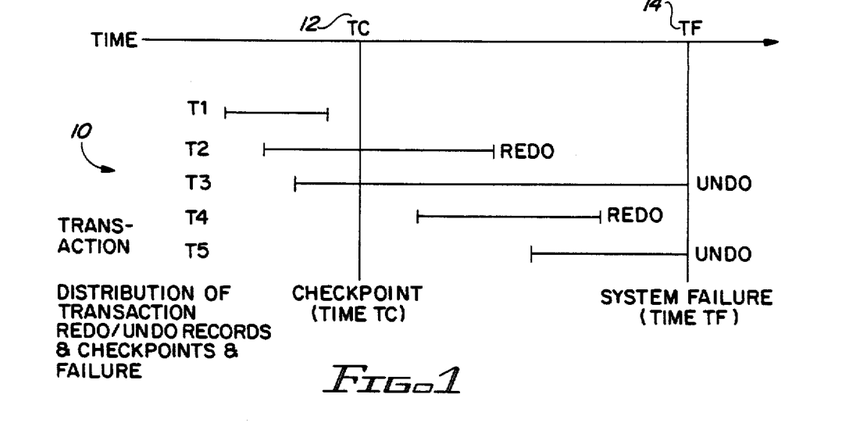
FIGS. 1–4 are illustrative of prior art methods.

Referring now to FIG. 1, there is shown the time of occurrence relations among transaction primitives 10 with reference to checkpoints 12 and system failure 14. At the occurrence of failure and hence restart, the Recovery Manager 15 must obtain the address of the most recent checkpoint record from a restart file or its equivalent, locate the checkpoint record in the system log, and proceed to search forward through the log from that point to the end. As a result of this process, the Recovery Manager is able to determine both the transactions that need to be undone (UNDO) and the transactions that need to be redone (REDO) in order to restore the resource to a consistent state.

Each transaction 10 is categorized in one of five classes. Thus, transactions of type T1 were completed before checkpoint time $T_c$ 12. Transactions of T2 started prior to Time $T_c$ and were completed after time $T_c$ but before the system failure time $T_f$ 14. Transactions of type T3 also started before time $T_c$ but did not complete before time $T_f$. Transactions of type T4 started after time $T_c$ but were completed before time $T_f$. Finally, transactions of type T5 started after time $T_c$ but did not complete by time $T_f$. Therefore, transactions T2 and T4 are subject to REDO, while transactions T3 and T5 are subject to UNDO.

The Recovery Manager starts two lists. The UNDO list initially contains all transactions listed in the checkpoint record, while the REDO list is initially empty. The Recovery Manager searches forward through the log, starting from the checkpoint record. If the Recovery Manager finds a BEGIN transaction record for a given transaction, it adds that transaction to the UNDO list. Likewise, if the Recovery Manager finds a COMMIT record for a given transaction, it moves that transaction from the UNDO list to the REDO list.

The Recovery Manager 15 works backward through the log again, undoing the transactions in the UNDO list. It finally goes forward again, redoing the transactions in the REDO list.

The above description provdes a source for characterizing selective record types as being REDOs/UNDOs. For purposes of completeness, reference should be made to FIGS. 2 and 3 which show a unit of recovery and its bounding primitives where the recovery respectively involves the REDO and UNDO of transactions.

Figure 2:
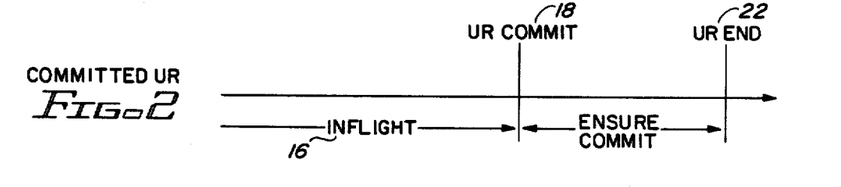
Figure 3:
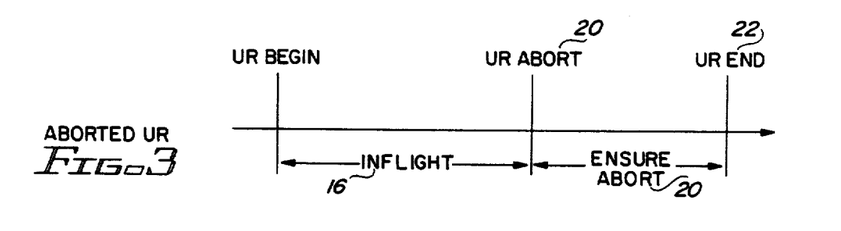

For completeness, several of the terms shown in FIGS. 2 and 3 should be defined. First, the term "INFLIGHT" 16 connotes a transaction 10 in progress and one which has not reached a consistent point. Occurrence of a failure while a transaction is inflight means that any partial effect upon a recoverable resource has to be negated; i.e., rolled back or backed out. Also, the terms "ENSURE COMMIT" and "ENSURE ABORT" relate to the time interval between the occurrence of a commit 18 or abort 20 and the end 20 of a transaction. In the method of this invention, the interval is used to migrate a subset of records associated with the unit of recovery and COMMIT or ABORT from a transaction recovery stream on a hard log to a resource recovery stream.

DESCRIPTION OF THE PREFERRED EMBODIMENT AND INDUSTRIAL APPLICABILITY

In the subsequent discussion, and according to the invention, FIGS. 5–12 relate to the method concept, while FIGS. 13–24 concern an illustrative embodiment.

Figure 25:
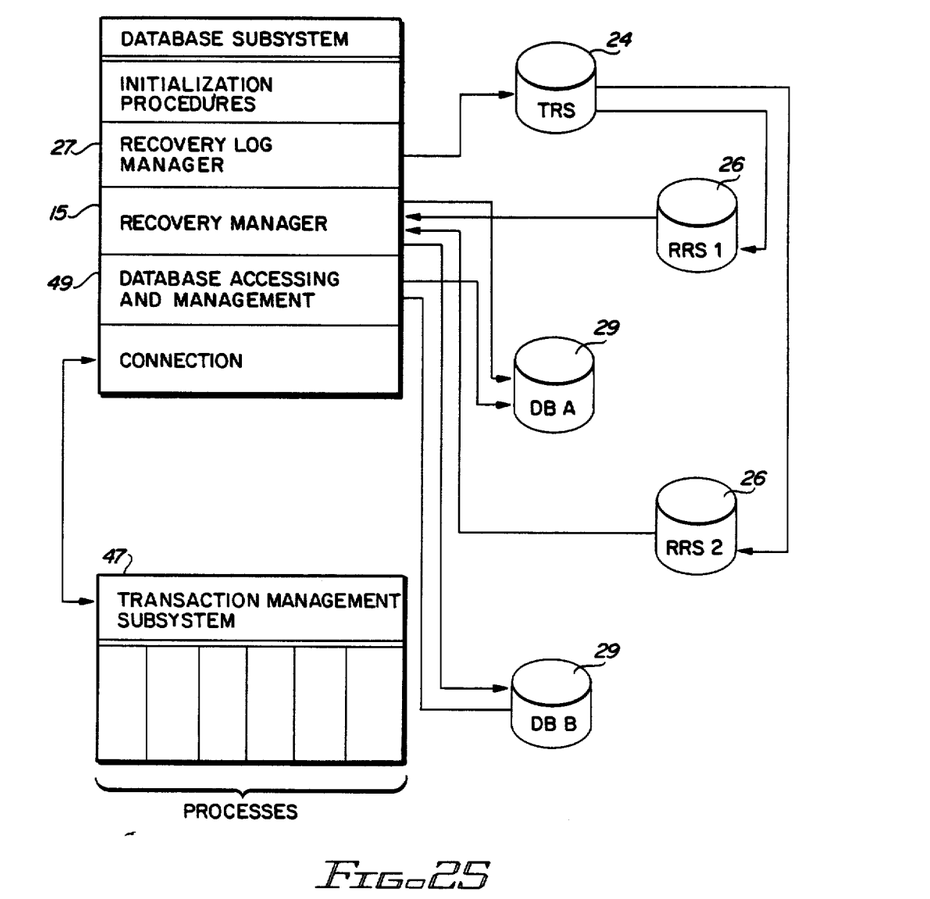

It should be appreciated that, in the prior art, a log is a single stream upon which is recorded data needed for system restart and data needed for media (resource) recovery. In this invention, instead of using merely a serialized recording of events, there is invoked the data construct of a reusable transaction recovery stream and multiple resource recovery streams, as schematically shown in FIG. 25.

Figure 5:
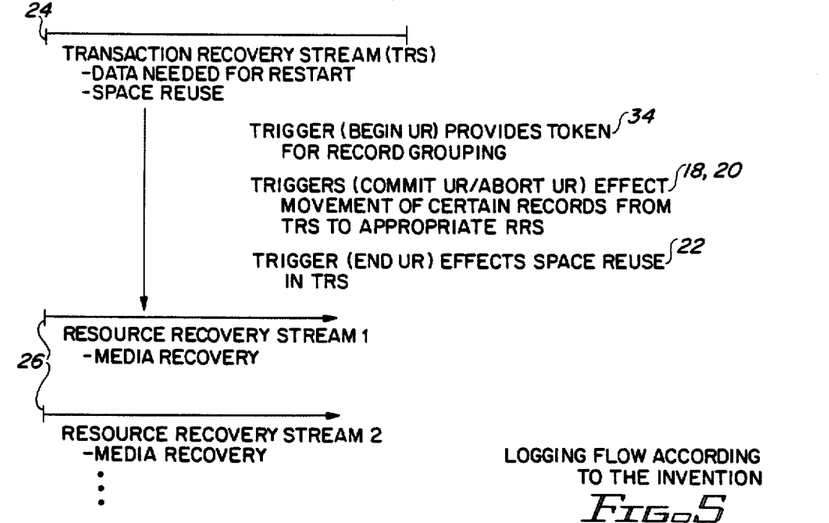
FIGS. 5–25 depict Applicants' improved method embodying the invention.
Figure 7:
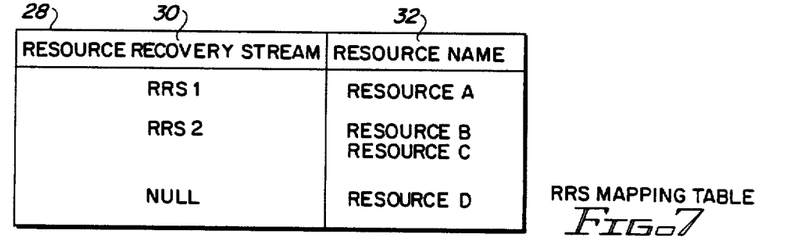

Referring now to FIG. 5, there is shown the relationship between the transaction recovery stream (TRS) 24 and the multiple RRSs 26 triggered by the UR primitives (BEGIN, COMMIT/ABORT, END). Once a transaction reaches an atomic point of consistency and its modifications have been externalized to the resource such as, for example, a data base 29, the space in the TRS occupied by all records relative to the transaction is available for reuse. Data needed for resource (media) recovery is maintained in the RRSs. The associated Log Manager 27 (denominated "logger") is provided with a mapping 28 of RRS/resource names 30, 32 see (FIG. 7). The resource name 32 is specified on a log WRITE call. The amount of data required for resource recovery is usally voluminous. This is because such data required for recovery represents a history of all permanent changes made to a modifiable resource.

Referring again to FIG. 5, it is apparent that the movement of data from the TRS 24 to the appropriate RRS 26 and the reclaiming of space within the TRS is affected by means of UR control triggers specified by the logger. These triggers are:

(1) BEGIN/END UR 34. This specifies the bounds of a unit of recovery as a set of atomic application program updates to a resource.

(2) COMMIT UR 18. This is a decision point indicating that an atomic transition point has been reached. Changes will be made to the resource across failures.

(3) ABORT UR 20. This is a decision indicating that program updates will be undone in the case that partial changes have been made to the modifiable resource.

Advantageously, the method of this invention will reuse space on the log and avoid the reading of media recovery records during system restart.

Figure 6:
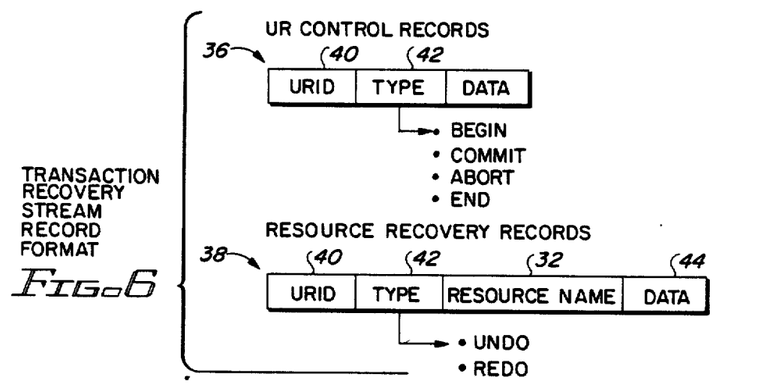

Referring now to FIG. 6, there is depicted the format of the log records 36, 38 within the TRS 24. The UR ID field 40 defines the UR partition to which a given log record belongs. The TYPE field 42 identifies the role of the associated data during recovery. The types fall into two categories. These are UR control and resource recovery. The UR control record 36 state changes in the UR. The state changes are communicated to the Log Manager by function calls. These function calls are BEGIN UR, COMMIT UR, ABORT UR, and END UR. Each event creates a UR control log record 36. The types supportable for UR control records are BEGIN, COMMIT, ABORT, and END. The resource recovery records 38 record the resource changes. The types supported for resource recovery records are UNDO and REDO. The REDO records contain the information necessary to repeat the resource change.

It should be noted that the resource name 32 is the field which applies to the resource recovery records only. This field identifies the resource being modified. The resource name also appears in the RRS mapping table 28 of FIG. 7. Lastly, the DATA field 44 is in resource specific or control specific information passed by the application. The Log Manager is not sensitive to the format or content of this data.

Referring now to FIG. 7, there is shown the RRS mapping table 28. The recovery data for a resource will be copied to the RRS 26 specified by this table. Note that an RRS may contain data for more than one resource, i.e. a one-to-n mapping. Parenthetically, non-recoverable resources are supported by providing a null resource RRS mapping. Thus, resource D is assigned to RRS NULL. Records 36, 38 for nonrecoverable resources are available for transaction recovery, but are not carried forward into an RRS.

Referring now to FIGS. 8–11, there are shown pseudo-code delineations of the UR control functions. Significantly, the pseudo-code expression is of the form typically used in the design of control and data flow. Such use is exemplified by Linger et al, "Structured Programming: Theory and Practice", The System Programming Series, Addison-Wesley Publishing Co., copyright 1979, ISBN 0-201-14461-1, Chapters 4–5.

Figure 8:
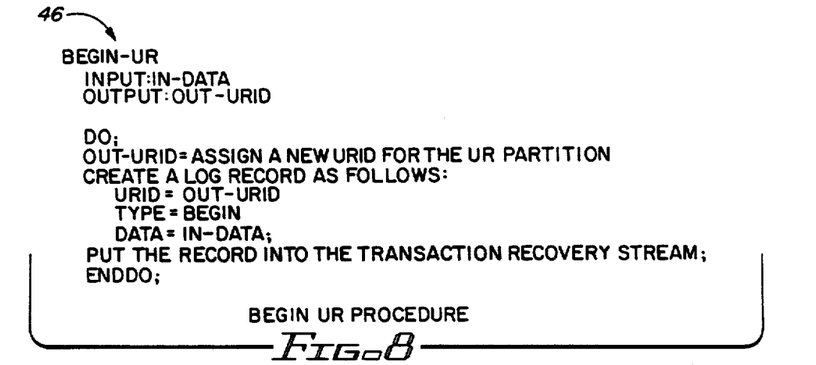
Figure 9:
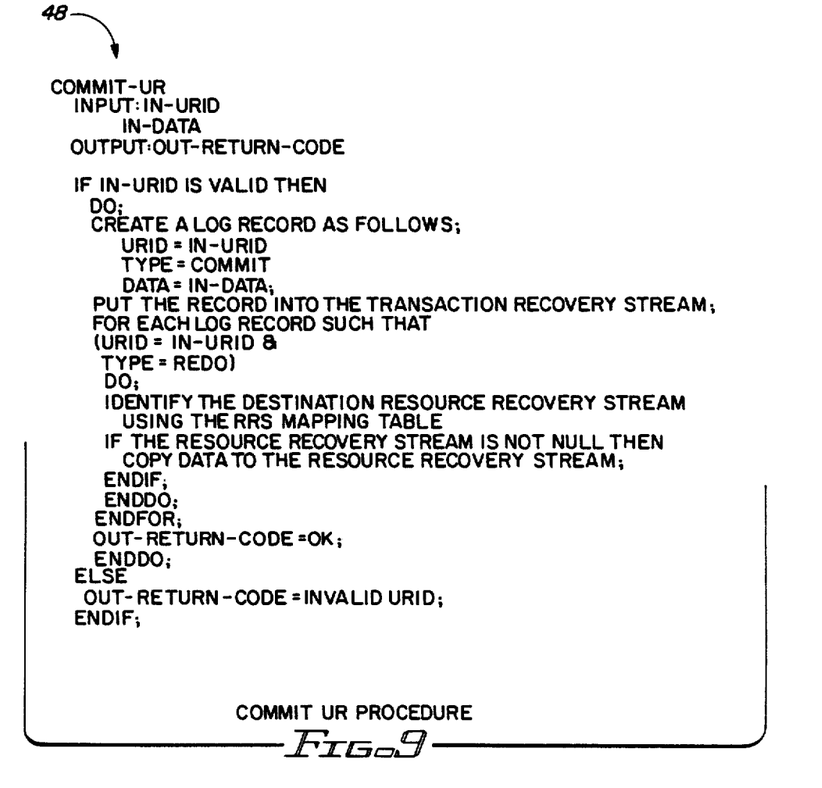
Figure 10:
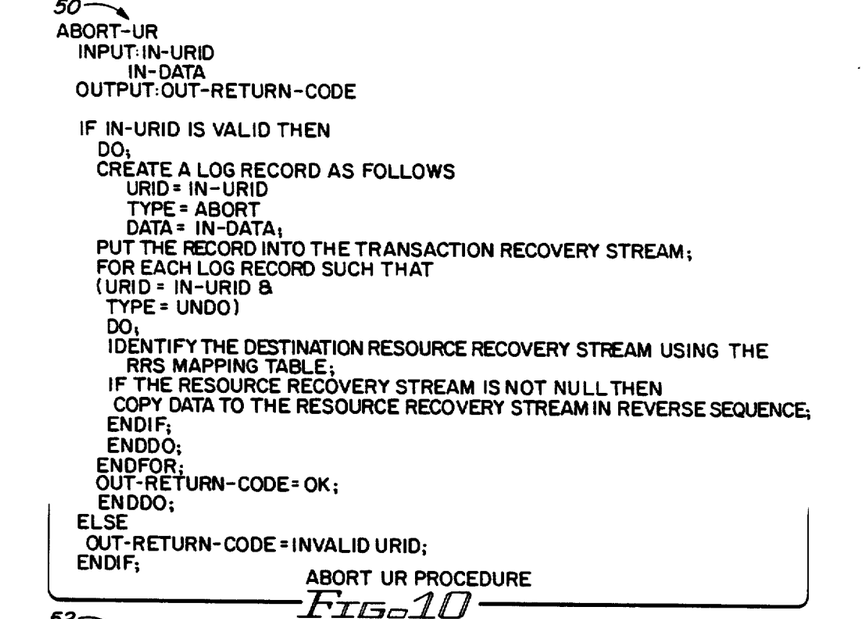

In FIG. 8, the pseudo-code 46 assigns an ID for the UR partition and creates a log record 36 on the TRS. At some time in the life of a UR, the decision is made to COMMIT or ABORT. If a COMMIT 18 is made, then the COMMIT UR procedure 48 of the logger shown in FIG. 9 is invoked. It should be recalled that prior to the COMMIT point being reached, several participants have donated resource recovery records 38 into the TRS 24. The records 38 are denominated REDO/UNDO by the Transaction Manager 47 or Data Base Manager 49, if applicable, as part of the information being supplied to the logger. The function of the primitives, their control record manifestation and response, may be seen in the following table:

| PROCEDURE | UR CONTROL RECORD | COPY (AS DISTINCT FROM WRITE) |
|---|---|---|
| BEGIN | BEGIN | TRS (create a log record UR partition) |
| COMMIT | COMMIT/REDO | TRS/RRS (REDO records 1:n mapped) |
| ABORT | ABORT/UNDO | TRS/RRS (UNDO records 1:n mapped in reverse order) |

Figure 11:
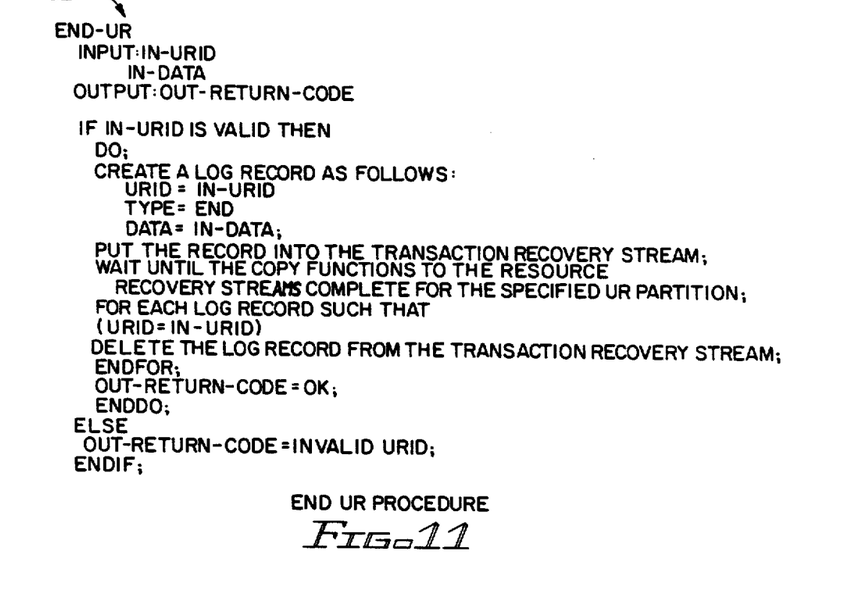

| PROCEDURE | UR CONTROL RECORD | COPY (AS DISTINCT FROM WRITE) |
|---|---|---|
| END | END | TRS (delete from TRS) |

It should be observed that the ABORT procedure 50 of FIG. 10 is symmetric with the COMMIT procedure. The table treats the procedures set out in FIGS. 8–11. However, it should be appreciated that the WRITE procedure 54 of FIG. 12 may be embedded several times in a transaction stream of the form BEGIN . . . WRITE, WRITE, . . . COMMIT/ABORT END. The WRITE procedure places a resource recovery record 38 of the UNDO/REDO type on the TRS if the record contains a resource name 32 found in the RRS mapping table 28.

Figure 4:
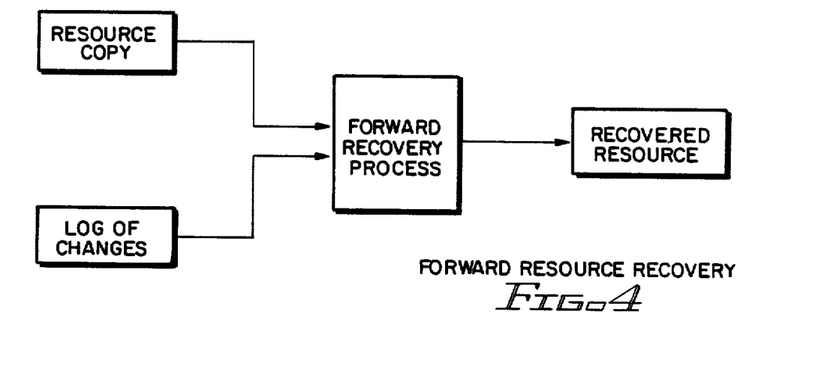

At this point, several observations are in order. First, the term "1:n mapping" references a UR partition defined on each of m resources which are distributed among n RRSs 26. Where m>n pertains, there is at least one RRS which contains the records/recovery data from at least two resources (see FIG. 4). This is an instance of Dirichelet's "Pigeonhole Principle". Another observation is made with reference to the pseudo-code procedures. A number of pseudo-code procedures 46, 48, 50, 52, 54 includes DO blocks. These are not the same as DO loops. DO blocks are executed only one time through. Thus, in FIG. 8, the objective is to establish a unit of recovery. The call to the procedure 46 is driven externally, but is responded to by the Log Manager. This places the record 36 in the TRS.

Figure 13:
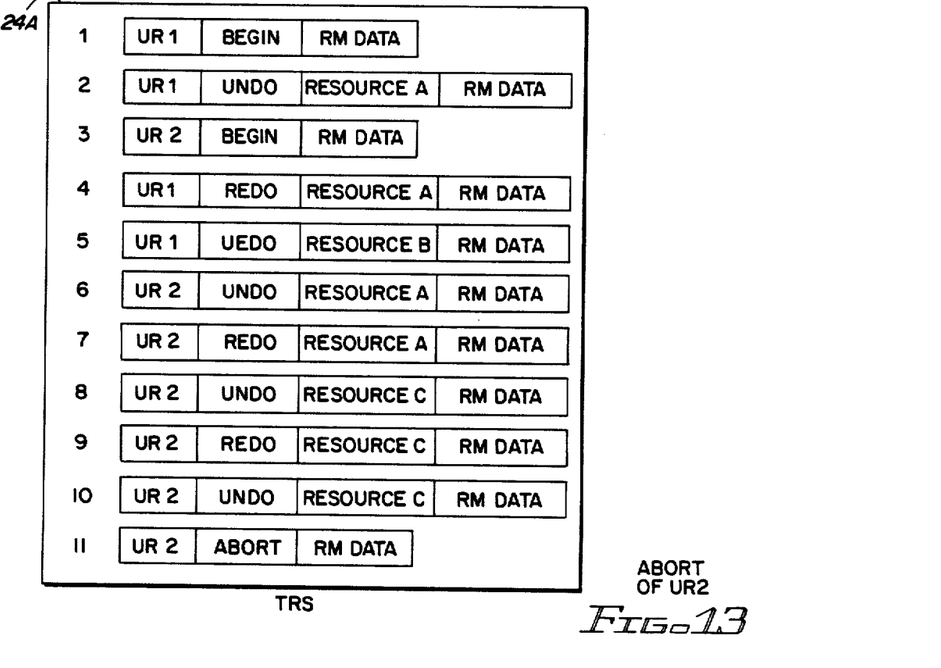

Referring now to FIG. 13, there are depicted two URs, namely, UR1 and UR2. The URs are going to alter the resources A, B, C, and D. In this example, UR1 is going to COMMIT its data, while UR2 is going to ABORT its data activity. Significantly, the decision either to COMMIT/ABORT is made external to the Log Manager. The activities exemplified include (1) movement of data from the TRS to the RRSs and (2) the subsequent deletion of the moved data from the TRS as a function of the END primitive.

Figure 14:
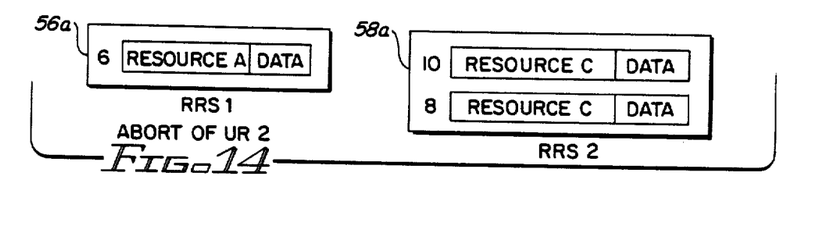

In FIG. 13, UR1 and UR2 were created with the counterpart BEGIN commands and installed on the TRS 24a. It is emphasized that the designation of a record as REDO/UNDO is made either by the Transaction or Data Base Manager and not by the Log Manager or logger. The records in FIG. 13 are shown in numbered sequence on the left. For instance, records 1-10 update the TRS for UR1 and UR2. Record 11 depicts an ABORT of UR2 and triggers the copying of UR2's UNDO records 6, 8, and 10 from the TRS to the appropriate RRS. In this regard, record 6 (resource A) is placed on RRS1 56a, while records 8 (resource C) and 10 (resource C) are placed on RRS2 58a. This placement, as set out in FIG. 14, is in accord with the RRS mapping table 28 as shown in FIG. 7. It is of interest that the UNDO records are placed on RRS2 in reverse sequence. This permits accurate forward processing during resource recovery. It is recalled in this regard that the ABORT (a form of rollback) has the object of backing out. For purposes of completeness, it should be noted that UNDO records need only be on the RRS if the transaction management supports data base copying in the presence of concurrent transaction activity.

Since the RRSs 56a, 58a consists only of committed images, then only a portion of the data residing in the TRS record sequence is required for resource recovery. In the case of the ABORT, only three UNDO UR2 records are copied to RRS1 56 and RRS2 58 out of seven UR2 records on the TRS 24a.

Figure 15:
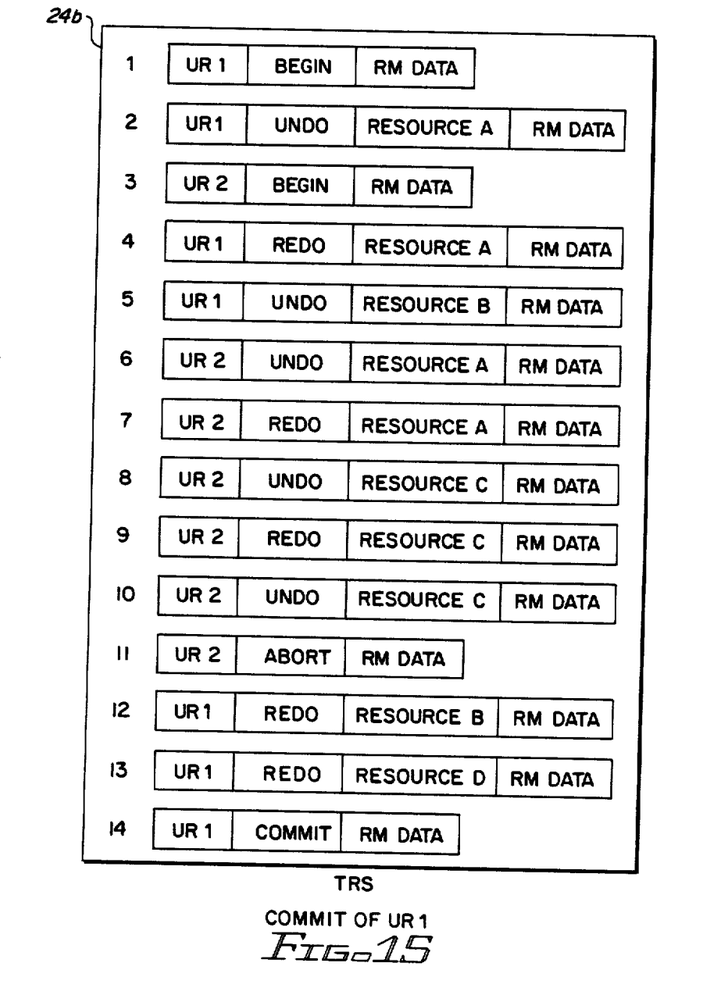
Figure 16:
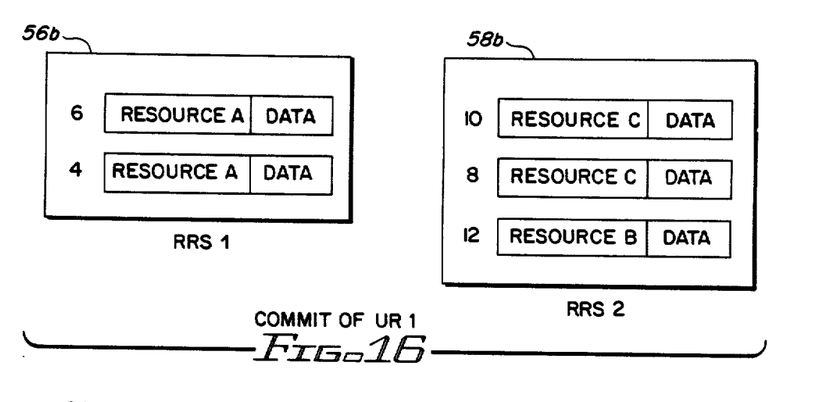

Referring now to FIGS. 15 and 16, there is shown the response required by the method of the invention to a UR1 COMMIT command recorded on the TRS 24b as record 14. The COMMIT triggers copying of the UR1 REDO records 4, 12, and 13 to RRS1 56b, RRS2 58b, and the null RRS, respectively. It should be observed that only half of the records on the TRS 24b are going to be copied to the RRSs, since each transaction at the decision point is driven either by a COMMIT or ABORT. If driven by a COMMIT, only REDO-type records are copied to the RRSs, while if ABORT, only UNDO-type records are copies to the RRSs.

Figure 17:
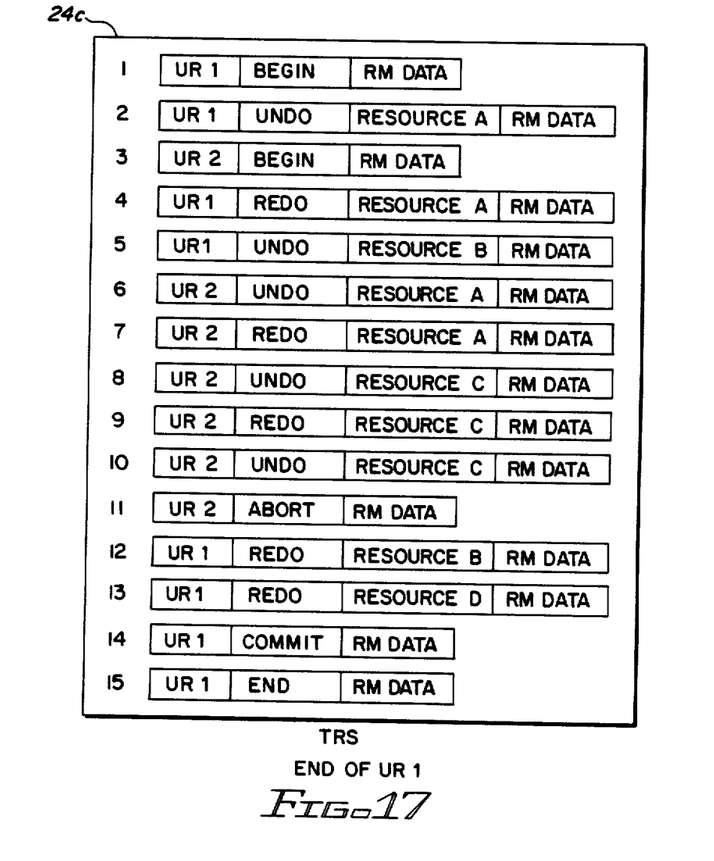
Figure 18:
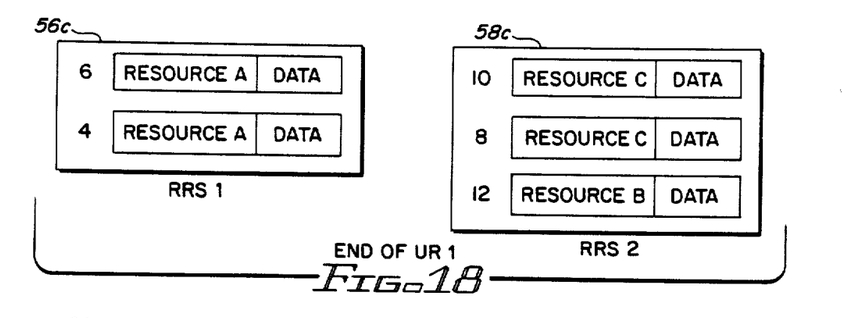
Figure 19:
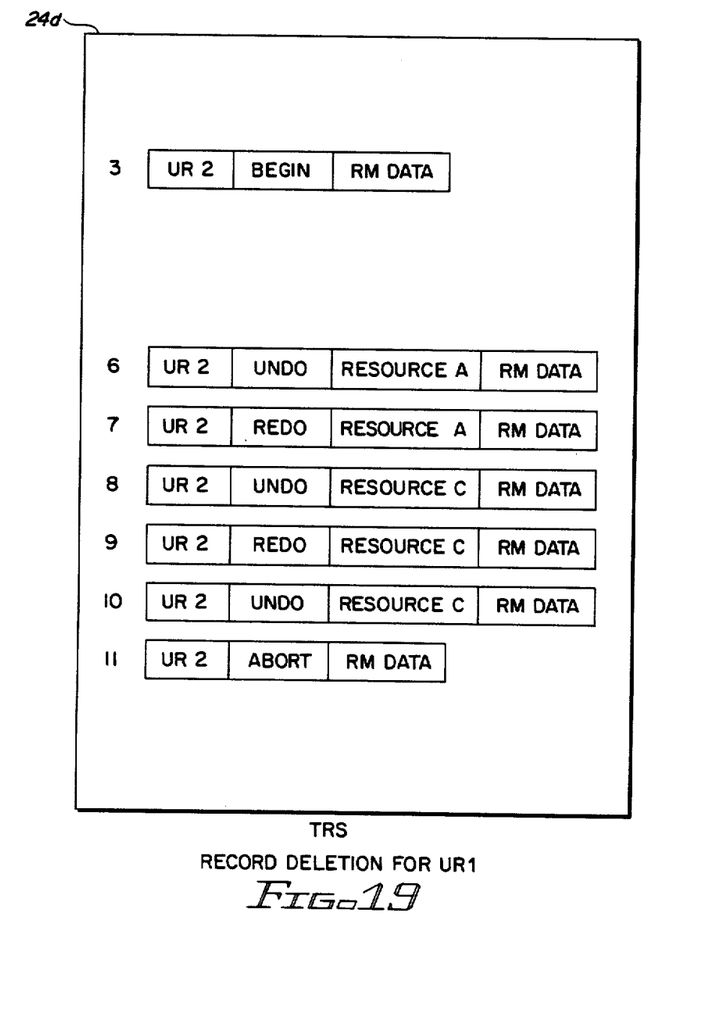
Figure 20:
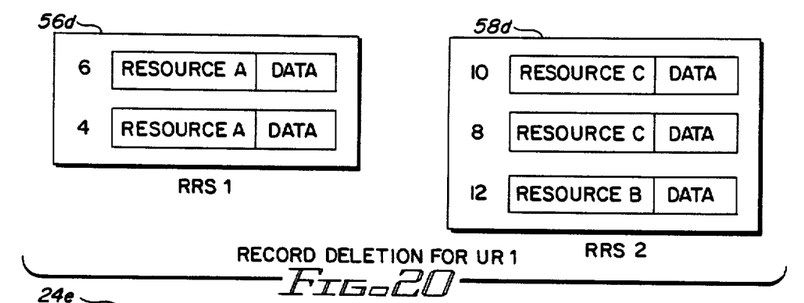
Figure 21:
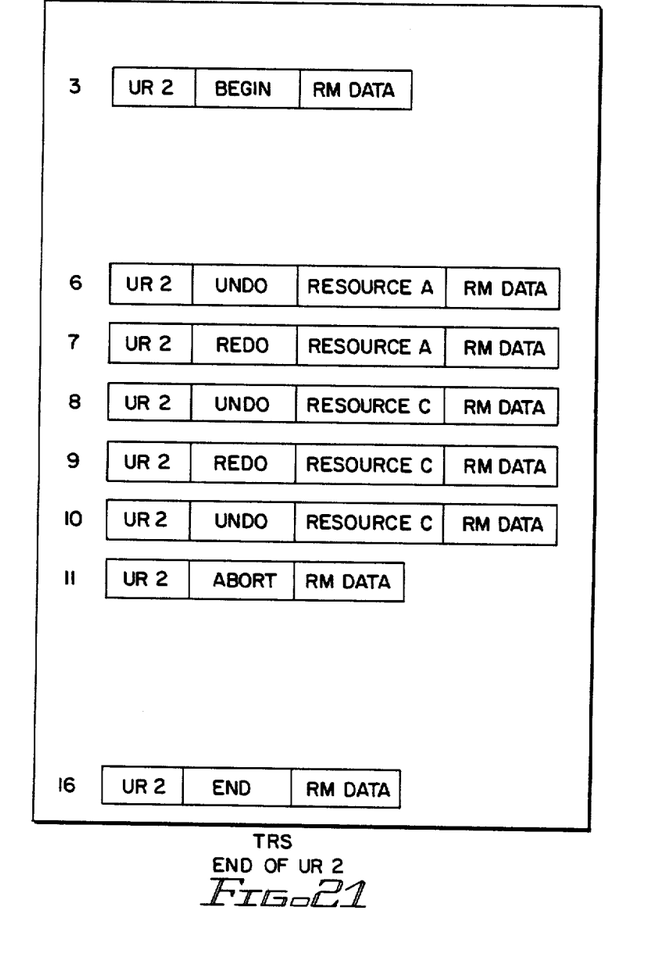
Figure 22:
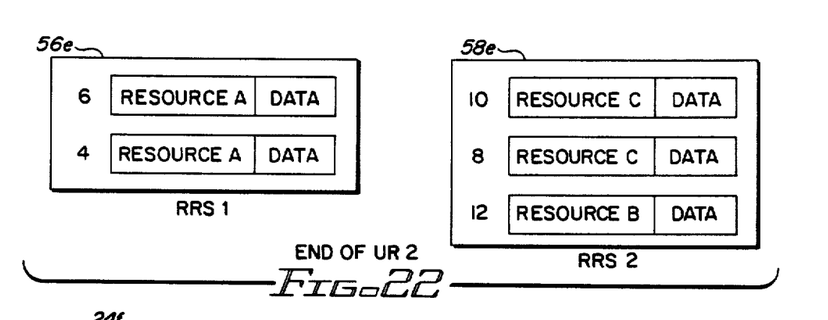
Figure 23:
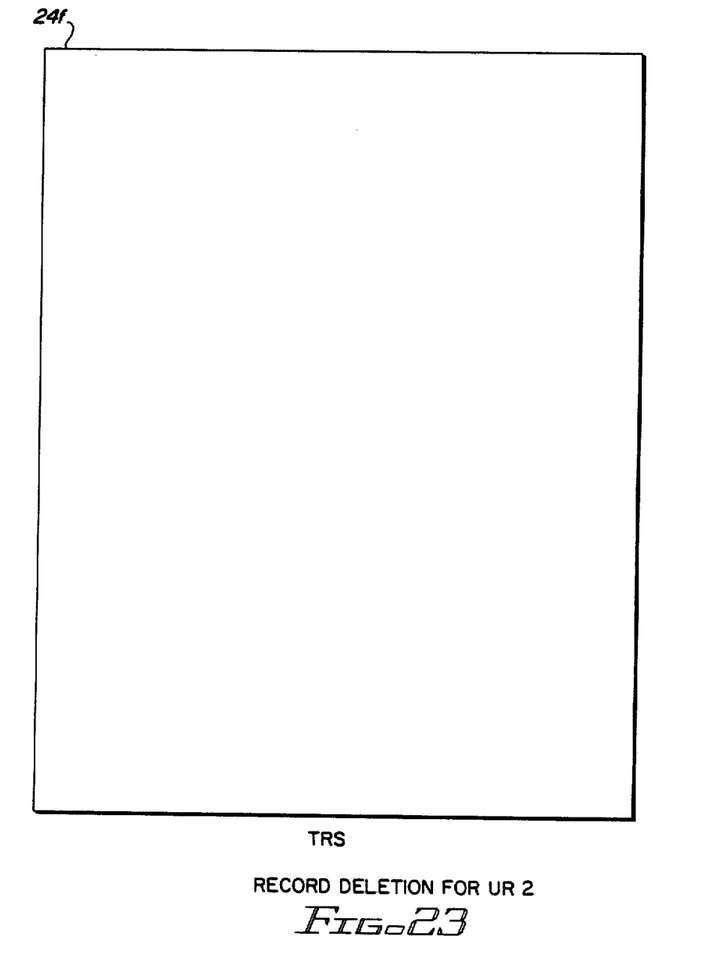
Figure 24:
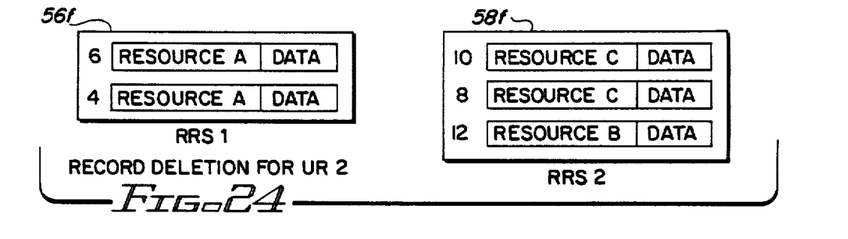

When the END UR1 command is received, as shown in FIG. 17, this triggers the record deletion process for UR1 from the TRS 24c. The contents of the RRSs 56c, 58c remain unaffected, as set out in FIG. 18. Execution of the END command removes all trace of UR1 from the TRS 24d, as displayed in FIG. 19. The execution of the END command for UR2 (shown in FIGS. 21–22) likewise effectuates removal of corresponding records from the TRS 24e, 24f, as shown in FIGS. 21–24. The RRS record sequences 56d–f, 58d–f remain intact, as depicted in FIGS. 20, 22, and 24.

We claim:

1. A method, implemented on a digital computer system, for managing the reuse of space on a hard log stored on memory means in said computer system in support of forward resource recovery (FIG. 4) in a transaction-oriented system in which concurrently executing, failure-independent processes share a common hard log and one or more resources, comprising the steps of:
   (a) recording log data on said memory means with a log manager in said computer system in a partitioned fashion by a unit of recovery (UR) in a transaction recovery stream (TRS) resident on the hard log, said UR selectively assuming an inflight, ensure commit, or ensure abort state (FIGS. 2, 3, 6);
   (b) classifying using said log manager to classify the log data into subsets (BEGIN, COMMIT, ABORT, END, REDO, UNDO) according to the function of their role in recovery (FIGS. 6, 8);
   (c) responsive to UR state changes from either inflight to ensure commit (FIG. 2) or inflight to ensure abort (FIG. 3), using said log manager to perform a one-to-n mapping of the log data of one of said subsets (typed REDO or UNDO shown in FIGS. 9, 10, 13–16) from a given UR partition on the TRS into resource recovery streams (RRSs) (FIGS. 5, 7); and
   (d) at the termination (END) of the UR state changes utilizing the RRSs, using said log manager to discard all log data identified on the hard log as belonging to the given UR partition from the TRS rendering space occupied by said discarded log data on said hard log amenable to reuse (FIGS. 11, 17–24).

2. The method according to claim 1, wherein the recorded log data in the TRS includes data to determine the UR state, data necessary to ensure an abort of the UR, and data necessary to ensure a commit of the UR.

3. The method according to claim 1, wherein the subset of log data subject to a one-to-n mapping includes records classified as REDO when the UR state is to commit (FIGS. 15, 16) or UNDO when the UR state is to abort (FIGS. 13, 14).

Figure 12:
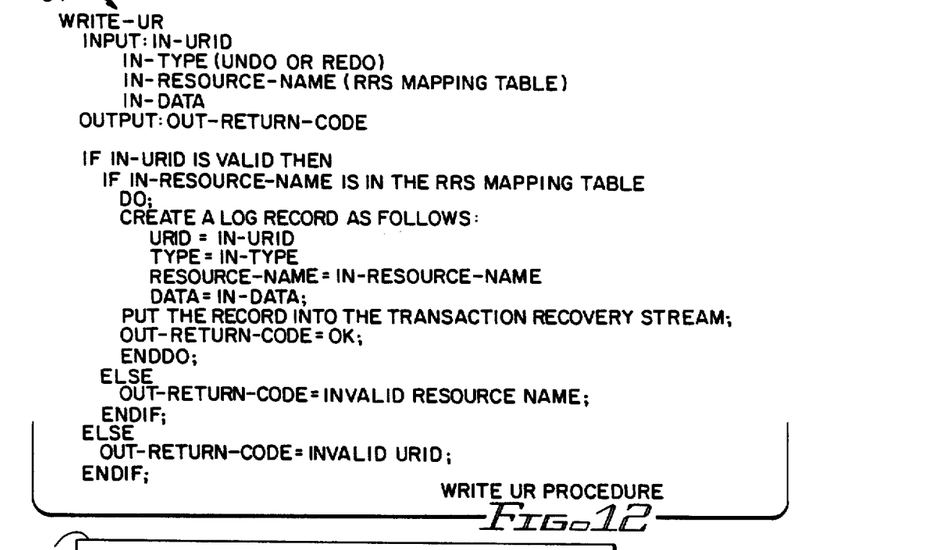

4. A method, implemented on a digital computer system, for managing the reuse of space on a hard log stored on memory means in said computer system in support of forward resource recovery (FIG. 4) in a transaction-oriented system in which concurrently executing, failure-independent processes share a common hard log and one or more resources, and further wherein each transaction utilizes begin, commit, abort, redo/undo operations to bound the transaction, and in which redos ensure transaction return to the most recent commit point and undos ensure return to the transaction begin point, comprising the steps of:
   (a) initiating the recording of log data on said memory means with a log manager in said computer system in a partitioned fashion by a unit of recovery (UR) using a begin marker on a transaction recovery stream (TRS) resident on the hard log (FIG. 8);
   (b) using said log manager to classify and then to write and then writing to the TRS log data into subsets according to the COMMIT, ABORT, REDO, UNDO function of their role in recovery (FIGS. 6, 8, 12);
   (c) upon a UR state change responsive to a commit operation, used said log manager to perform a one-to-n mapping of all log data in the REDO subset of the UR partition from the TRS into predeterminedly associated resource recovery streams (RRSs), and upon a UR state change responsive to an abort operation, to perform a one-to-n mapping of log data in the UNDO subset of the UR partition from the TRS into predeterminedly associated RRSs (FIGS. 9, 15, 16 for commit and FIGS. 10, 13, 14 for abort); and
   (d) at the termination (END) of the UR state changes utilizing the RRSs, using said log manager to discard all log data identified on the hard log as belonging to the given UR partition from the TRS rendering space occupied by said discarded log data on said hard log amenable to reuse (FIGS. 11, 17–24).

5. The method according to claim 1 or 4, wherein a UR partition defined on each of m resources is distributed among n RRSs where m>n such that at least one RRS contains the log data from two resources (FIGS. 18, 20, 22, 24).

* * * * *

UNITED STATES PATENT AND TRADEMARK OFFICE
CERTIFICATE OF CORRECTION

PATENT NO. : 4,878,167

DATED : October 31, 1989

INVENTOR(S) : K. M. Kapulka; H. A. Rader; and J. P. Strickland

It is certified that error appears in the above-identified patent and that said Letters Patent is hereby corrected as shown below:

IN THE SPECIFICATION:

Column 1, Line 59, change "denomiated" to --denominated--.

Column 2, Line 64, change "Tenner" to --Jenner--.

Column 4, Line 48, change "5-25" to --5-24--.

Column 5, Line 66, change "provdes" to --provides--.

Column 6, Line 63, insert "point" after "decision".

IN THE CLAIMS:

Column 9, Line 43, delete "classifying".

Column 10, Line 32, delete "and then writing".

Column 10, Line 37, change "used" to --using--.

Signed and Sealed this

Twenty-seventh Day of November, 1990

Attest:

HARRY F. MANBECK, JR.

Attesting Officer

Commissioner of Patents and Trademarks